(No Model.)

J. C. APPLEBY.
MACHINE FOR MAKING SOFT METAL PIPES.

No. 374,165. Patented Dec. 6, 1887.

Witnesses:
Charles A. Herbert.
Albert E. Aubery

Inventor:
J Charles Appleby

UNITED STATES PATENT OFFICE.

J. CHARLES APPLEBY, OF JERSEY CITY, NEW JERSEY.

MACHINE FOR MAKING SOFT-METAL PIPES.

SPECIFICATION forming part of Letters Patent No. 374,165, dated December 6, 1887.

Application filed April 2, 1887. Serial No. 233,348. (No model.)

*To all whom it may concern:*

Be it known that I, J. CHARLES APPLEBY, a citizen of the United States, residing at Jersey City, in the county of Hudson and State of New Jersey, have invented certain new and useful Improvements in Machines for Making Pipes, Tubes, &c.; and I do hereby declare that the following is a full, clear, and exact description of the invention, which will enable others skilled in the art to which it appertains to make and use the same.

The object of this invention is to provide for the easy and convenient supply of lead, soft metal, alloy, or other plastic material to the cylinder of an apparatus for making pipes, tubes, and the like, and also to insure strength and durability, ease and efficiency of operation, and convenience and certainty of adjustment of the several parts of such apparatus. The said invention comprises certain novel means whereby the said objects are secured.

Figure 1:
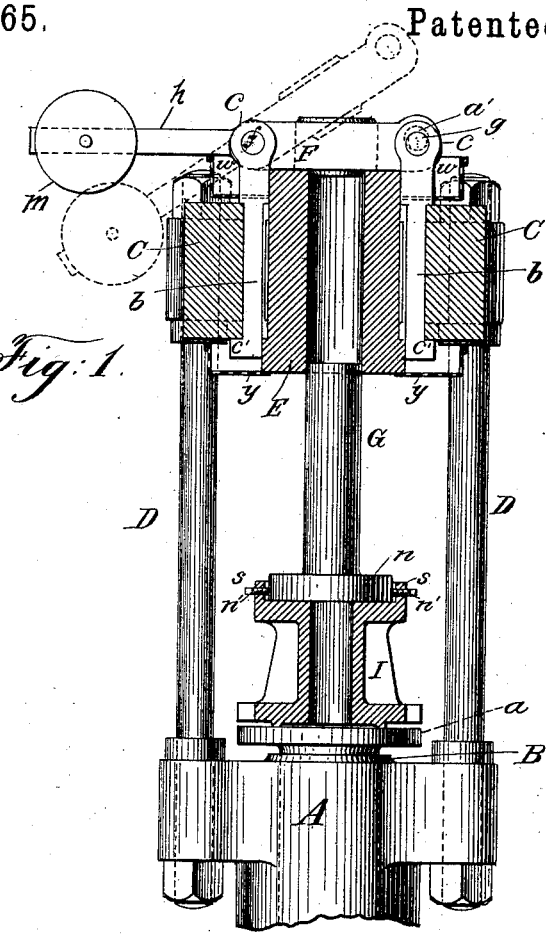
Figure 2:
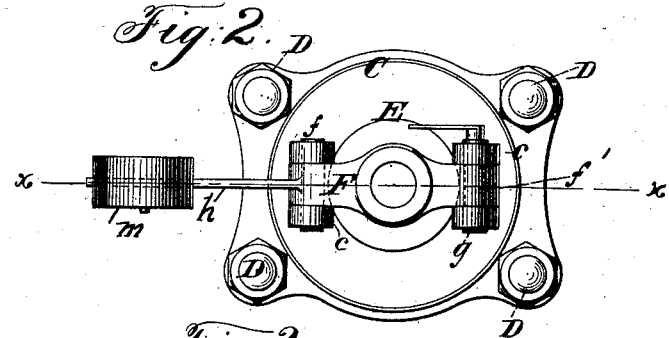
Figure 3:
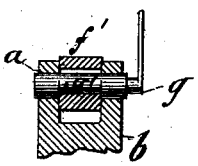

Figure 1 is a vertical transverse sectional view of an apparatus embracing my said invention, taken in the line $x\,x$ of Fig. 2. Fig. 2 is a plan view of said apparatus, and Fig. 3 is a detail view on a larger scale, further illustrating one of the views of my said invention.

A is the usual cylinder of a hydraulic press. B is the plunger of said press, and $a$ is the "water-table," so termed, ordinarily provided upon the outer end of the hydraulic plunger B. C is the head of the hydraulic press, placed in the usual relation with the water-table $a$, and connected therewith by the usual tension-rods, D. These parts do not differ materially, except in so far as hereinafter explained may be necessary for the purposes of my invention, from the hydraulic cylinder, plunger, water-table, head, and tension-rods of an ordinary hydraulic press.

The head C is bored out or centrally chambered from top to bottom to receive what for convenience I term a "lead-cylinder," E, said cylinder being designed to receive the lead or other soft metal or alloy or plastic material from which the pipe, tube, or other article is to be made. Vertical bolts $b$ extend up through the inner portions of the head C, outside of the cylinder E, and are provided at their upper ends with lugs $c$, which are provided with transverse eyes $a'$. The lower ends of the bolts $b$ are provided with lateral shoulders $c'$, which hold upon the under inner edge of the head C in such manner as to prevent the upward movement or withdrawal of the bolts $b$. In the eyes $a'$ of the bolts $b$, at one side of the head C, is pivoted by a pivot, $f$, a block, F, which carries the die through which the contents of the cylinder E is forced for the production of the pipe, tube, or other article. For the production of a non-tubular article—as, for example, wire—this die may be simply a circular orifice, the shape and diameter of which determine the shape and diameter of the wire. For the production of a tubular article—such, for example, as lead pipe, &c.—the circular orifice is provided in any suitable manner with a core of less diameter than the orifice and placed in the same axial line, so that the space between the core and the circumference of the orifice determines the thickness of the walls of the pipe or tube. As the construction of such annular dies for use in the production of pipes, tubes, &c., is well known in various modified forms, it is not necessary to describe the same in detail here, it being only necessary that the annular die, when the parts are fixed in position for use, shall have such relation to the lead-cylinder that the contents of the latter, by pressure duly applied, shall be forced through the die. Therefore any suitable annular die may be provided to the apparatus.

The block F being brought down upon and across the upper end of the cylinder has a lug, $f'$, which passes between the lugs $c$ of the bolts $b$ at that side of the head C opposite that at which the said block is pivoted. The lug $f'$ of the block F is bored out transversely, the said bore of said lug $f'$ being coincident with the eye $a'$ when the block F is closed down, as aforesaid, so that a bolt thrust through the eye $a'$ and the bore aforesaid will fasten down the block with the annular die of the latter in due relation with the lead-cylinder. In order that the block F may be tightened down with the requisite snugness upon the end of the cylinder, the bolt aforesaid, indicated by the reference-letter $g$, is constructed with an eccentric, $g'$, as shown in the detail view, Fig. 3, so that by axially turning the said bolt $g$ the block is braced forcibly down to its place on the end of the cylinder. The block F is provided with an arm, $h$, on which is a counterpoise, $m$.

When it is desired to fill or supply the cylinder E with the lead or other soft metal or alloy or plastic material from which the pipes, tubes, or other articles are to be made, the bolt $g$ is withdrawn, whereupon the counterpoise tilts the block F and opens the end of the cylinder to permit the latter to be supplied, as aforesaid, which done, the block is again replaced against the end of the cylinder and secured, as hereinbefore explained.

G is the ram-head or plunger, which enters the cylinder from its lower end by an inward or upward movement, which ejects the material through the die of the block F to form the pipes, tubes, or other articles. This ram-head or plunger G is provided with a horizontal flange, $n$, which rests upon the top of the column I, the lower end of said column resting upon the water-table $a$ of the plunger B of the hydraulic cylinder A, so that by this means the piston or plunger G is securely connected with the piston or plunger B, so that the movement of the latter gives motion to the former, great stability and solidity being likewise given to the base or lower end of the piston or plunger G. In order to provide for further and more firmly securing the piston or plunger G to the column I, the latter is provided at the top with a circumferential flange, $s$, through which are inserted set-screws $n'$, the inner ends of which bear against the circumference of the flange $n$ of the piston or plunger G, and, being suitably adjusted, hold the latter against lateral displacement and retain it in the requisite relation with the cylinder E and the plunger B.

Around the top of the cylinder E is a fire-pot or brazier, $w$, and around the bottom of the cylinder is a similar fire-pot or brazier, $y$. The two braziers $w$ and $y$ provide a means whereby the cylinder may be heated to any extent required to insure the desired plasticity of the lead, soft metal, alloy, or plastic material within the cylinder E, and from which the pipes, tubes, or other articles are to be made.

To permit the convenient arrangement of the fire-pots or braziers $w$ and $y$, the top, and bottom of the cylinder E are arranged to project above and below a corresponding top and bottom of the head C of the hydraulic press.

What I claim as my invention is—

1. The combination of a block, F, provided with a suitable die, with the cylinder E, a piston or plunger, G, and devices for securing the swinging end of said block firmly to said cylinder to resist the outward pressure of material within the cylinder as said material is forced to and through the die, substantially as and for the purpose herein set forth.

2. The combination of a block, F, provided with a suitable die, with the cylinder E, a piston or plunger, G, devices for securing the swinging end of said block firmly to said cylinder to resist the outward pressure of material within the cylinder as said material is forced to and through the die, and arms $h$ and counterpoise $m$, substantially as and for the purpose herein set forth.

3. The combination, with the head C of a hydraulic press, of a cylinder, E, a piston or plunger, G, bolts $b$, having eyes $a'$, pivoted block F, having a suitable die, and devices for fastening the swinging end of said block to the eyes of the bolts $b$ opposite those to which the block is pivoted, all substantially as and for the purpose herein set forth.

4. The combination, with the head C of a hydraulic press, of a cylinder, E, a piston or plunger, G, bolts $b$, having eyes $a'$, pivoted block F, having a suitable die, and bolt $g$, constructed with an eccentric, $g'$, substantially as and for the purpose herein set forth.

5. The combination, with the head C of a hydraulic press, of the cylinder E, arranged to project above and below the said head, the fire-pots or braziers $w$ and $y$, and a piston or plunger, G, substantially as and for the purpose herein set forth.

6. The combination, with the head, the cylinder, the plunger, and the water-table of a hydraulic press, of the cylinder E, arranged within the said head, the piston or plunger G, arranged to work into the said cylinder and constructed with the flange $n$, the column I, constructed and arranged to receive the lower end of the piston or plunger G, provided with the flange $s$ and interposed between the flange $n$ and the water-table aforesaid, and set-screws $n'$, provided in the flange $s$ of the column and bearing against the circumference of the flange $n$, all substantially as and for the purpose herein set forth.

J. CHARLES APPLEBY.

Witnesses:
CHARLES A. HERBERT,
ALBERT C. AUBERY.